June 4, 1935.  S. MILLER  2,003,549
SEAT ADJUSTER
Filed Sept. 1, 1932  2 Sheets-Sheet 2
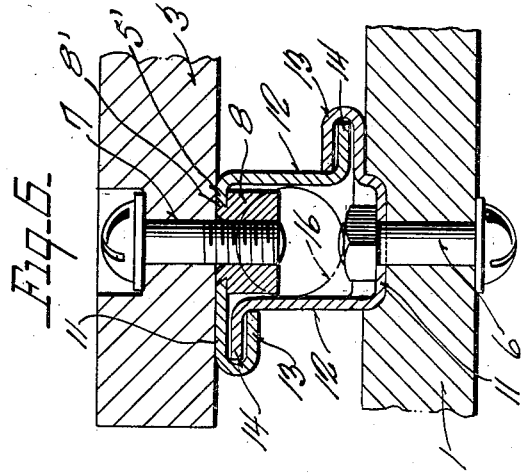
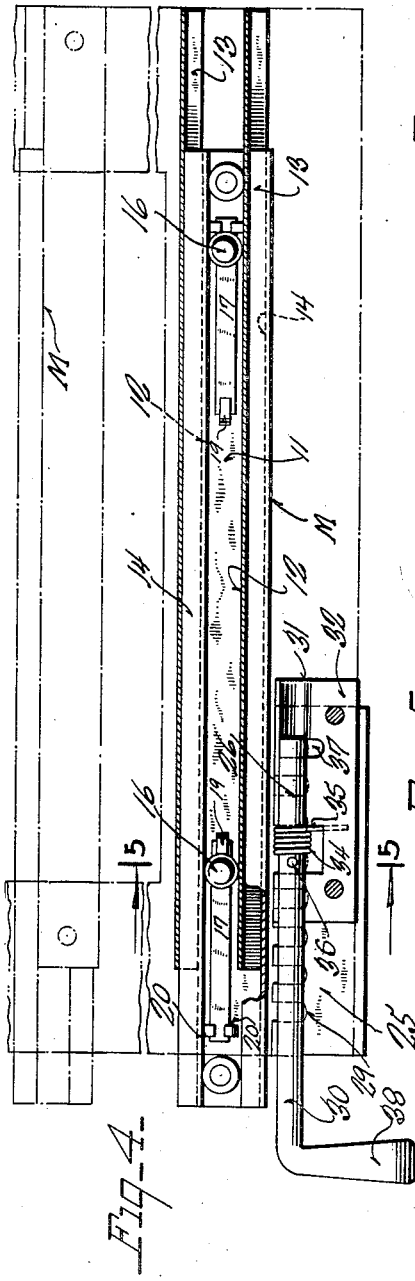
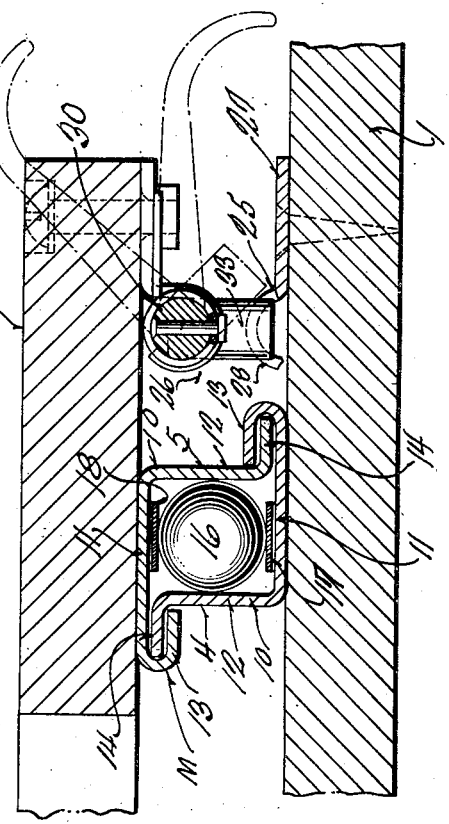
INVENTOR.
Swift Miller
BY
Bottum, Hudnall, Lecher,
McNamara & Michael
ATTORNEYS Patented June 4, 1935

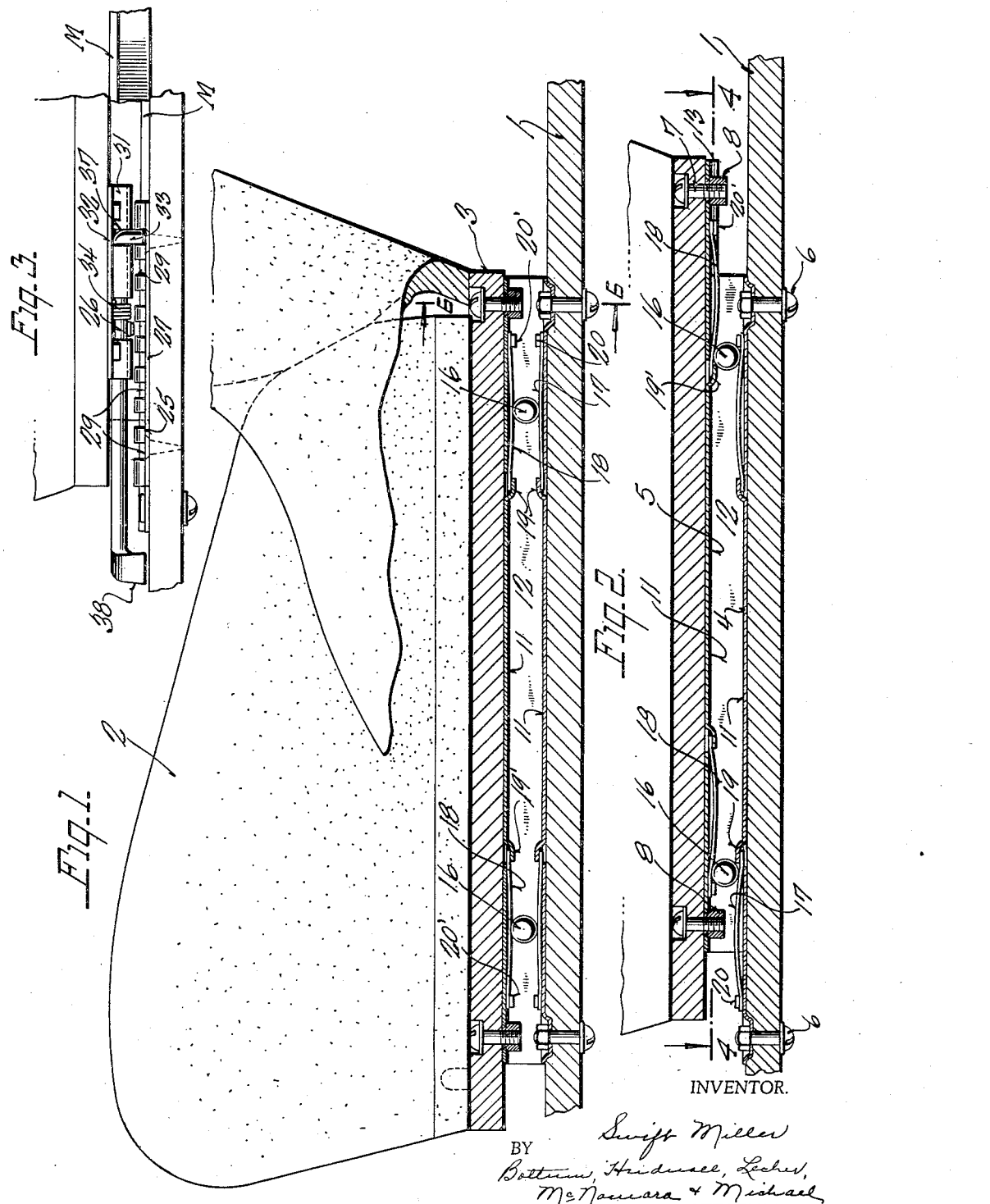

2,003,549

UNITED STATES PATENT OFFICE 2,003,549

SEAT ADJUSTER

Swift Miller, Wauwatosa, Wis., assignor to E. R. Wagner Manufacturing Company, Milwaukee, Wis., a corporation of Wisconsin Application September 1, 1932, Serial No. 631,335

6 Claims. (Cl. 155—14)

This invention relates in general to adjustable seats for automobiles or the like and more particularly to a novel means providing for the adjustable mounting of the seat and the securing of the same in adjusted position.

Among the objects of the invention are to provide a seat mounting which, while easily moved or adjusted when desired, is devoid of rattle and also is simple and durable in construction, reliable and effective in operation, and easy and comparatively inexpensive to manufacture and install.

Another object is to provide a seat mounting having ball bearings or equivalent anti-friction bearings interposed between its relatively movable parts in such manner that the bearings take the load and facilitate free adjustment. Raceways are organized with said bearings in such a novel way as to allow of free movement and yet take up and withstand wear and preclude rattling. Further, the main members of each mounting unit are of similar construction so as to be interchangeable.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partially in side elevation and partially in longitudinal vertical section illustrating a portion of the seat, its support and showing one of the mounting units employed for the seat;

Figure 2 is a fragmentary view similar to Figure 1 with parts omitted and illustrating another adjustment of the seat;

Figure 3 is a fragmentary view in side elevation illustrating one means which may be employed for holding the seat in various adjusted positions;

Figure 4 is a fragmentary view in horizontal section taken on line 4—4 of Figure 2;

Figure 5 is a view in transverse vertical section taken on line 5—5 of Figure 4; and Figure 6 is a similar sectional view taken on line 6—6 of Figure 1.

Referring to the drawings, the numeral 1 designates the support for the seat of an automobile or the like which may be the floor boards of the vehicle and the numeral 2 designates generally the seat structure proper. The seat is illustrated as having a bottom frame or base 3. Interposed between the seat frame 3 and its support 1 are a pair of mounting units designated generally at M, one such unit being provided adjacent each side of the seat and the units extending longitudinally of the seat and parallel to each other.

The mounting units M are of novel construction and therein are incorporated the principal features of the present invention. These mounting units are identical and each consists of a pair of similar interfitted members designated at 4 and 5, the members 4 and 5 being of similar or identical construction but being oppositely arranged. The member 4 is secured in fixed position by means of bolts and nuts 6 to the support 1 and constitutes a trackway while the member 5 is secured by screws or studs 7 and nuts 8 to the seat frame 3 and constitutes a slide. The studs 7 have their heads countersunk in recesses provided therefor in the seat frame 3 and have their threaded shanks engaged with the nuts 8. The nuts 8 are suitably secured to the members 5 and while the manner of securing may be varied, Figure 6 shows one mode of effecting this purpose and as illustrated in the figure referred to each nut 8 has a reduced extension 8' swaged or riveted into engagement with a beveled opening 5' in its member 5.

As described, the members 4 and 5 are of similar or substantially identical construction and each comprises an angular body portion 10. Each angular body portion 10 has a horizontal section 11 and a vertical section 12. The horizontal sections 11 have reversely bent or inturned flanges 13 while the vertical sections 12 have straight or plane flanges 14 along their longitudinal edges. In the assembly the straight or plane flanges 14 are slidably and somewhat loosely interfitted with the reversely bent flanges 13. As a result the slide member 5 is constrained to longitudinal sliding movement with respect to the track member 4. The reversely bent flanges 13 provide structure defining guide grooves and these grooves have a vertical dimension slightly in excess of the thickness of the straight or plane flanges 14 fitted therein whereby the slides have a capacity for a slight vertical movement relative to their track members or trackways.

Interposed between the slide members 5 and the track members 4 are suitable anti-friction bearings which are illustrated as ball bearings 16. In the construction illustrated, each mounting unit is provided with two ball bearings 16 which are spaced longitudinally one from the other. A raceway is provided for each ball bearing 16 and consists of a pair of opposed strips designated at 17 and 18 and suitably secured to the track member 4 and slide member 5, respectively, of the mounting unit with which they are associated. In the drawings, one mode of securing the strips in position is shown and in the example selected for the purpose of illustration, each strip 17 has one end confined under a lug 19 struck from the horizontal portion 11 of its track member 4 and has its opposite end confined between a pair of transversely spaced and extending lugs 20 also struck from the horizontal sections 11 of its track member 4. Each strip 18 may be similarly secured in position by means of lugs 19' and 20' struck from the horizontal sections 11 of the slide members 5 and corresponding in structure and arrangement to the lugs 19 and 20. The strips 17 and 18 are preferably constituted of hardened metal such as spring steel or other suitable material and, if desired, my be constructed with an inherent tendency to bow or flex toward each other in the manner illustrated in the drawings. Such flexing tendency may be realized by cutting the strips from a coil of strip material or by imparting a permanent bow thereto. The surfaces of the hardened spring metal strips presents an appropriate raceway to the ball bearings which effectively withstands wear. The bowed formation of these strips tends to retain the elements of the assembly against rattling or vibration and yet when the seat is depresesd or a load placed thereon the seat is free to move relative to its support since at such time the full load is taken by the ball bearings and the plane flanges 14 of the interfitted slide and trackway are free of frictional engagement with the walls of the grooves defined by the reversely bent flanges 13. This same operation and results may be more or less approximated by using straight hardened metal strips (which need not be resilient or springy) provided close clearances are employed. The lugs 20 and 20' are arranged and dimensioned to provide for assembly, these lugs permitting the ball bearings in certain relative adjustments of the slides and trackways to be forced into the assembly without damaging the structure. In the assembly, however, the lug and spring strip arrangement preclude accidental disassembly of the elements of the structure and the strips retain the ball in proper relative position. If desired, a single pair of opposed strips may be used to provide one continuous raceway for all the balls 16 between each slide and trackway.

Any suitable means may be provided for releasably securing the seat in various selected adjustments relative to its support and one example of such a means comprises generally a fixed rack 25 and a cooperable locking means designated generally at 26. The fixed rack 25 has a flat attaching portion 27 securely fastened to the support 1 and has integral with such attaching portion a curved extension 28 provided with longitudinally spaced notches 29 which constitute a rack. The locking element 26 consists of a short shaft or stem 30 supported for rotation in the arcuate bearing portion 31 of a suitable mounting bracket, which bracket has a flat attaching portion 32 securely fastened to the base or frame 3 of the seat. A radial locking lug 33 is integral with or otherwise suitably secured to the shaft or stem 30 and is selectively cooperable with any one of the notches 29, depending, of course, upon the relative adjustment of the seat and its support. A coil spring 34 encircles the shaft 30 and has one terminal 35 engaged with the attaching portion 32 of the mounting bracket and has its other terminal pinned or otherwise suitably secured as at 36 to the shaft 30. This spring 34 is tensioned to urge the shaft to so turn as to position the locking lug 33 in one of the notches 29. The locking lug 33 turns in a slot 37 formed in the portions 31 and 32 of the mounting bracket and the ends of the slot appropriately limit the extent to which the shaft 30 may turn. The forward end of the shaft 30 is provided with a handle 38 which is located in a position convenient to the occupant of the seat so that the occupant may readily grasp the handle 38 and turn the shaft 30 to disengage the locking lug 33 from the notch 29 in which it has been positioned. This frees the seat for adjustment which may be readily effected by sliding the seat fore or aft as desired. When the selected adjustment has been realized, the occupant releases the handle 38 whereupon the spring 34 reengages the locking lug 33 with the notch 29 with which it is then alined.

While I have shown and described one embodiment of the invention it is to be understood that the construction shown has been selected merely for the purposes of illustration or example and that various changes in the size, shape or arrangement of the parts may be made without departing from the spirit of the invention or the scope of the subjoined claims.

The invention claimed is:

1. A vehicle seat mounting including interengaged track and slide members, said members being of similar construction and having a body portion of angular cross section with a straight flange along one edge of the body portion and a reversely bent flange along the other edge thereof, the reversely bent flange of each member being slidably interfitted with the straight flange of the other.

2. A vehicle seat mounting including interengaged track and slide members, said members being of similar construction and having a body portion of angular cross section with a straight flange along one edge of the body portion and a reversely bent flange along the other edge thereof, the reversely bent flange of each member being slidably interfitted with the straight flange of the other, opposed spring strips secured to said members and positioned adjacent the inner faces of the tops and bottoms thereof, at least one of said strips being bowed toward the other intermediate its ends, and ball bearings engaged with said strips.

3. A vehicle seat mounting including interengaged track and slide members, said members being of similar construction and having a body portion of angular cross section with a straight flange along one edge of the body portion and a reversely bent flange along the other edge thereof, the reversely bent flange of each member being slidably interfitted with the straight flange of the other, opposed spring strips positioned adjacent the inner faces of the tops and bottoms of said members, lugs struck from said members and engaging said strips, at least one of said strips being bowed toward the other intermediate its ends, and ball bearings engaged with said strips.

4. A vehicle seat mounting including interengaged track and slide members, said members being of similar construction and having a body portion of angular cross section with a straight flange along one edge of the body portion and a reversely bent flange along the other edge thereof, the reversely bent flange of each member being slidably interfitted with the straight flange of the other, and a ball bearing interposed between said members to support one member on the lower for sliding movement and to prevent the straight flanges from being displaced out of the space between the reversely bent flanges.

5. A vehicle seat mounting including a trackway adapted to be fixed in position, a slide adapted to be secured to the vehicle seat, means interconnecting the slide and trackway to constrain the slide to sliding movement longitudinally of the trackway and to limited vertical movement relative thereto, bowed metal strips oppositely related and secured to said slide and said trackway, said strips adapted to flex under load and rest flatly against said slide and trackway to provide hardened flat bearing surfaces and antifriction means between said strips.

6. A vehicle seat mounting comprising interchangeable upper and lower members of similar construction, said members having interengaging flanges adapted for relative longitudinal shifting movement said flanges being laterally shiftable into and out of interengagement and a ball bearing between oppositely related portions of said members, said bearing acting to support said members for longitudinal shifting movement and to prevent said flanges from shifting laterally out of interengagement.

SWIFT MILLER.